United States Patent [19]
Letcher, Jr.

[11] Patent Number: 5,581,672
[45] Date of Patent: Dec. 3, 1996

[54] SYSTEM OF RELATIONAL ENTITIES FOR OBJECT-ORIENTED COMPUTER-AIDED GEOMETRIC DESIGN

[75] Inventor: John S. Letcher, Jr., Southwest Harbor, Me.

[73] Assignee: AeroHydro, Inc., Southwest Harbor, Me.

[21] Appl. No.: 406,389

[22] Filed: Mar. 17, 1995

Related U.S. Application Data

[63] Continuation of Ser. No. 70,023, May 28, 1993, abandoned, which is a continuation-in-part of Ser. No. 810,960, Dec. 19, 1991, abandoned.

[51] Int. Cl.⁶ .................. G06F 15/00; G06F 19/00; G06G 7/48
[52] U.S. Cl. .................. 395/120; 395/919; 395/326; 395/964; 364/474.24; 364/578
[58] Field of Search .................. 395/118, 119, 395/120, 155, 157, 161, 160, 919; 364/474.05, 474.24, 578

[56] References Cited

U.S. PATENT DOCUMENTS

| | | | |
|---|---|---|---|
| 4,479,196 | 10/1984 | Ferrer et al. | 364/900 |
| 4,635,208 | 6/1987 | Coleby et al. | 364/491 |
| 4,663,616 | 5/1987 | Himelstein | 345/121 |
| 4,829,446 | 5/1989 | Draney | 364/488 |
| 4,864,497 | 9/1989 | Lowry et al. | 364/300 |
| 4,868,766 | 9/1989 | Oosterholt | 395/120 |
| 4,912,657 | 3/1990 | Saxton et al. | 395/155 |
| 4,953,106 | 8/1990 | Gansner et al. | 395/160 |
| 5,003,498 | 3/1991 | Ota et al. | 395/120 |
| 5,253,189 | 10/1993 | Kramer et al. | 364/578 |
| 5,257,365 | 10/1993 | Powers et al. | 395/600 |
| 5,265,197 | 11/1993 | Kondo | 395/120 |

OTHER PUBLICATIONS

Tiler, "Rational B–Splines for Curve and Surface Representation," IEEE, 61–69 (1983).
FL/2B Documentation, Fairline System Hull Design Program, Version 2.8, (1990).
Sigplan, "ACM Sigplan History of Programming Languages Conference," Sigplan Notices, vol. 13:59–80 (1978).
Brown, "PADL–2: A Technical Summary," IEEE, 72–84 (1982).
Armit, "TAG—A High Performance Interactive 3D Graphics System," Computers in Industry, 3:117–123 (1982).
Gossard, et al., "Representing Dimensions, Tolerances, and Features in MCAE Systems," IEEE, 51–59 (1988).

(List continued on next page.)

*Primary Examiner*—Raymond J. Bayerl
*Assistant Examiner*—Ba Huynh
*Attorney, Agent, or Firm*—Fish & Richardson, P.C.

[57] ABSTRACT

Geometric objects including points, lines, curves, surfaces and solids are defined and constructed in a system which retains and utilizes relationships and dependencies between objects in a directed graph (digraph) data structure. The primary advantage is automatic updating of the model, preserving dependencies, when an underlying object is changed. Multiple types of parametric curves and surfaces and multiple levels of dependency are easily supported through a recursive program structure. Difficulties of surface-surface intersection and trimming are largely avoided by provision of novel entities which permit construction of accurate and durable joins between surface objects. An example model (FIG. 27) of a sailing yacht design illustrates six surface objects of several types with the defined dependency relationships. The hull 271, deck 272, cabin forward 273, cabin side 274, cabin aft 275 and cabin top 276 surfaces intersect at joins 278, 279 which are accurate and durable. The connectivity at the joins and the relative positioning of the surfaces are automatically preserved as the model is updated by changing one of the surfaces.

36 Claims, 8 Drawing Sheets

OTHER PUBLICATIONS

Wilson, "Numerical Control in Manufacturing," McGraw–Hill, 354–361 (1963).

Sutherland, "Sketchpad, A Man–Machine Graphical Communication System," MIT, (1963) (Submitted in Partial Fulfillment of the Requirement sof the Degreeof Doctor of Philosophy).

LaBozzetta, et al., "AIAA–84–2389 Interactive Graphics for Geometry Geometry Generation—A Program With a Contemporary Design," AIAA/AHS/ASEE Aircraft Design Systems & Operations Meeting, (Oct. 31,–Nov. 2, 1984).

MacKrell, "Making Sense of a Revolution," Computer Graphics World, 26–38 (1993).

Piegel, "Fundamental Developments of Computer–Aided Geometric Modeling," Academic Press, 321–346 (1993).

AIAA–87–2902 D. K. Snepp, et al., "A Geometry System for Aerodynamic Design" (1987).

AIAA–91–0800 W. K. Capron, et al., "Advanced Aerodynamic Applications of an Interactive Geometry and Visualization System," (1991).

NASA–CP–3143 A. E. Gentry, "Requirements for a Geometry Programming Language for CFD Applications," (1992).

Mortenson, "Geometric Modeling," 552–571 (1985).

Faux, "Computationa Geometry for Design and Manufacture," 156–231 (1979).

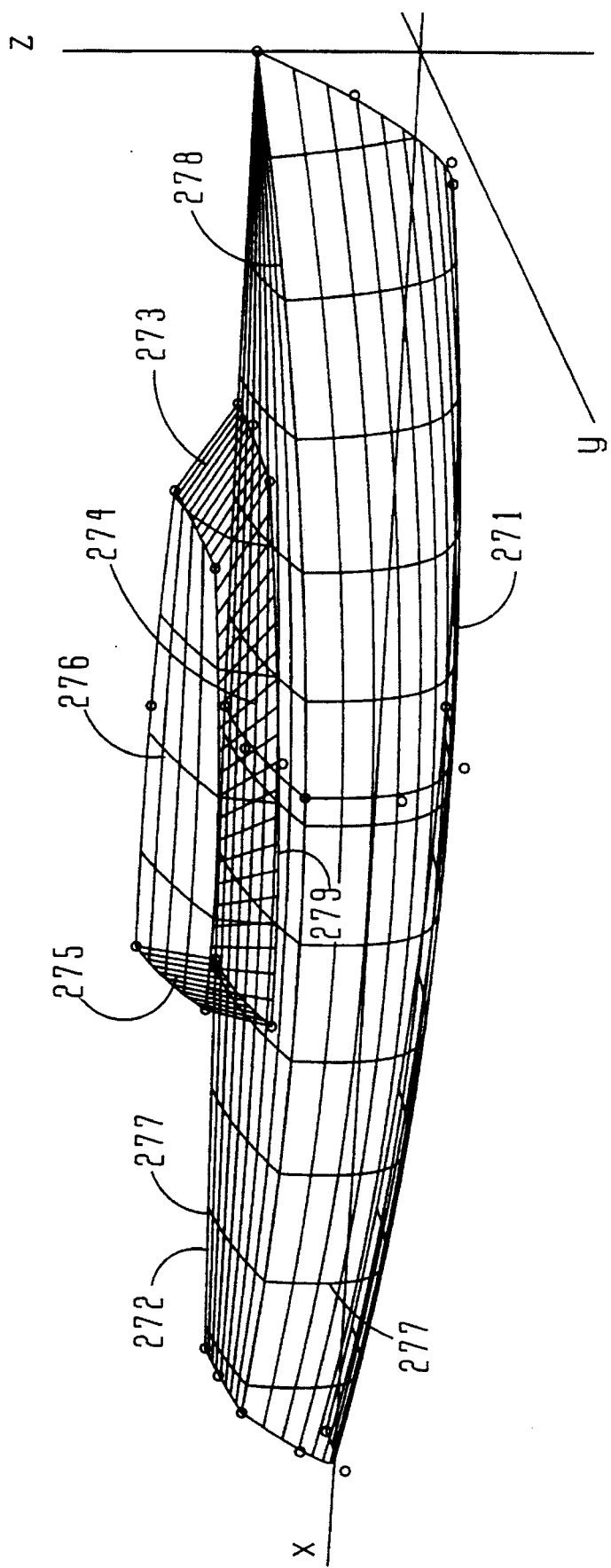

SYSTEM OF RELATIONAL ENTITIES FOR OBJECT-ORIENTED COMPUTER-AIDED GEOMETRIC DESIGN

This is a continuation of application Ser. No. 08/070,023, filed May 28, 1993, abandoned which is a continuation-in-part of Ser. No. 07/810,960 filed Dec. 19, 1991, now abandoned.

FIELD OF THE INVENTION

The invention relates to a method of representing two- and three-dimensional geometric objects in a data structure. The method is particularly useful in the field of computer-aided design and numerical-control manufacturing of complex geometric objects made up of curves, surfaces, and solids.

BACKGROUND OF THE INVENTION

Geometric definition is an essential element in the design of practically any object to be manufactured. Until recently, geometric definition was performed primarily by drafting scale drawings of the object. In the last two decades, computer-aided geometric design (CAGD) has largely supplanted drafting. In CAGD, mathematical representations of an object's geometry are stored in computer memory and manipulated by the computer user. Sometimes the product of a CAGD design is scale drawings produced on a plotting device; in other cases a CAGD representation of the object is transmitted to numerical-control (NC) machinery for automated production of the object. The CAGD representation may also serve as a basis for analysis and evaluation of the design aside from visual aspects, e.g. finite-element stress analysis.

One well-known example of a CAGD program is AutoCAD (R), produced by AutoDesk, Inc. of Sausalito, Calif. Initially a two-dimensional environment simulating the drafting process on paper, AutoCAD now provides a three-dimensional environment in which many types of geometric entities including points, lines, curves, surfaces and solids can be defined, positioned, and edited to build up extremely precise definitions of highly complex objects. There are other CAGD programs which are much less general than AutoCAD, but are better adapted to specialized purposes; e.g. FAIRLINE (R) by AeroHydro, Inc., which is adapted to the special task of creating fair surfaces for ship hull design. CAGD programs for workstation and mainframe computers, for example IGDS (R) by Intergraph Corp., Huntsville, Ala., provide more flexible surface and solid modeling entities, such as nonuniform rational B-spline (NURBS) surfaces.

In a CAGD program, each object springs into existence at the time when it is created, either by execution of a user command, or as a result of reading data from a file. In most circumstances the new object is positioned, oriented or constructed in some deliberate relationship to one or more objects already in existence. For example, line B may be created in such a way that one of its endpoints is one end of a previously existing line A. However, the relationship which was clearly in mind of the user at the time line B was created is not retained by the CAGD program; so if in some later revision of the geometry line A is displaced, then line B will stay where it is and no longer join line A. A conventional CAGD representation of geometry therefore consists of a large number of essentially independent simple objects, whose relationships are incidental to the manner and order in which they were created, but are not known to the program.

If design always proceeded in a forward direction, the loss of relationship information would not be a problem. One would start a project, add objects until the design is complete, and save the results. However, it is well known that engineering design is only rarely a simple forward process. It is far more commonly an interative process: design is carried forward to some stage, then analyzed and evaluated; problems are identified; then the designer has to back up to some earlier stage and work forward again. It is typical that many iterative cycles are required, depending on the skills of the designer, the difficulty of the design specifications, and any optimization objectives that may be present. In each forward stage, the designer will have to repeat many operations he previously performed (updating), in order to restore relationships that were disrupted by the version of other design elements. For example, he may have to move the end of line B so it once more joins line A; he may have to do this many times in the course of the design. CAGD systems typically provide extensive editing functions to facilitate these updates.

Revisions of a previously existing design to meet new requirements in common situation where similar problems are encountered. A change that alters an early stage of the design process requires at least one forward pass through all the subsequent design stages to restore disrupted relationships. Particularly if the relationships, and the sequence of design stages to achieve them, have been lost (and they are not normally retained in a way accessible to the user), the updating process can be very difficult, error-prone and time consuming.

Some partial solutions to this problem are known. In some CAGD programs including AutoCAD, line A and B can be created together as part of a "polyline" entity; then their connectivity will be automatically maintained if any of their endpoints, including their common point, are moved. Christensen (U.S. Pat. No. 4,663,616) has disclosed the concept of a "sticky" attribute which causes selected lines to remain connected to objects they are deliberately attached to. Draney U.S. Pat. No. 4,829,446) has disclosed the concept of giving points in two dimensions serial numbers, and locating another point in two dimensions (a "relative Point") by its relationship (x,y coordinate offsets) to a numbered point. Oosterholt (U.S. Pat. No. 4,868,766) has disclosed the concept of giving all geometric objects names, and locating each object in relationship to at most one other object, in a tree structure of dependency. Ota et al. (U.S. Pat. No. 5,003,498) have disclosed a CAGD system in which some objects have names, and are used by name in the construction of other more complex objects. Saxon (U.S. Pat. No. 4,912,657) discloses a system of "modular parametric design" in which design elements can be stored and conveniently recreated with different leading dimensions.

As mentioned above, many CAGD surface modeling systems support only a single type of surface, e.g. the FAIRLINE (R) surface, which is created from explicit cubic splines lofted through a set of B-spline "Master Curves". Although this surface can be molded into a wide variety of shapes useful in its own domain of ship hull design, there are many shapes it cannot make; e.g. it cannot form either an exact circular cross section or a completely round nose, both common features of submarine hulls. CAGD programs suited to mechanical design, such as AutoCAD, frequently support several simple surface types such as ruled surfaces and surfaces of revolution, but do not support more complex free-form surfaces such as B-spline parametric surfaces.

Although it is widely appreciated that there would be large advantages in supporting a broader set of curve and surface types within a single CAGD environment, this has heretofore been possible only in workstation and mainframe CAGD systems, presumably because of the complexity of the programming required.

One known partial solution to this problem is to support only a single surface type, which has sufficient degrees of flexibility to encompass a useful set of simpler surfaces as special cases. Nonuniform rational B-spline (NURBS) surfaces have been proposed to fill this role, since by special choice of knots and coefficients the NURBS curve can accurately represent arcs of circles, ellipses, and other useful conic section curves. Disadvantages of this approach include the obscure relationship between the selection of knots and coefficients to achieve a desired curve; the large quantity of data required to define even a simple surface such as a circular cylinder; nonuniformity of resulting parameterizations; and the general unsuitability of NURBS surfaces for interactive design of surfaces having special requirements such as fairness or developability.

In CAGD surface modeling systems, intersections between surfaces often account for much of the complexity in both the program and the user interface. In a typical application, surface Y is constructed, then surface Z is constructed in such a way that it intersects surface Y. The next step is often to find the curve of intersection of Y and Z; then portions of Y and/or Z which extend beyond that curve may be discarded (trimmed). The problem of intersection of two surfaces is inherently difficult, for several reasons. The two surfaces may not intersect at all. Finding any single point of intersection requires solution of three simultaneous, usually nonlinear, equations. These equations will be ill-conditioned if the intersection is at a low angle. The intersection may be a single point, a simple arc, a closed curve, a self-intersecting curve, or multiple combinations of these elements. The surfaces might actually coincide over some finite area. Once a curve of intersection is found, it is often difficult to indicate correctly which portion of which surface is to be discarded. After trimming, a parametric surface patch may no longer be topologically quadrilateral, so it can no longer be conveniently parameterized.

OBJECTS OF THE INVENTION

It is an object of the present invention to provide a CAGD environment which minimized the effort required to revise and update geometric models, by capturing, storing and utilizing essential dependencies between the model's geometric objects. A second object of the invention is to provide a CAGD surface modeling environment in which a wide variety of curve and surface types are supported for convenience and flexibility. A third object of the invention is to provide a CAGD surface modeling environment in which the difficulties of intersecting and trimming surfaces are largely avoided by providing convenient ways to construct surfaces which contact and join one another accurately in the first place, with contacts and joins that are automatically maintained during updates of the model.

SUMMARY OF THE INVENTION

In this summary, a three-dimensional design space is contemplated, utilizing Cartesian coordinates (x, y, z) for the location of points. Some principles of the invention could also be advantageously applied in a design space of two dimensions, or of more than three dimensions, or with non-Cartesian coordinates.

Definition: An entity is a type of geometric object defined within the system, and requiring a specific set of data for its actualization. Common CAGD entities are the point, the line, the arc, the Bezier patch.

Definition: An object is an actualization of an entity; for example, a point located at (1., 2., 3.).

Definition: A logical model is any valid collection of objects, i.e., a set of valid objects in which all dependencies are satisfied.

Definition: An absolute model is a geometric representation computed from a logical model, in which all points are located by their absolute coordinates.

The first objective just mentioned (utilizing dependencies) is achieved by associating with each object in the model a unique name (or number), and defining and implementing a series of entity types whose actualizations depend on, by referencing the names (or numbers) of, other objects in the model. According to the invention, the dependency relationship between objects has the logical form of a directed graph (diagraph). This data structure is known to the program, is available to be manipulated by the user, is stored along with specific numerical data to form the complete internal representation of the model, and is used to selectively update the model following alternation of any component object. Those qualitative properties of the model which are automatically maintained by utilizing the data structure of dependencies are referred to below as "durable" properties.

Each node of the dependency diagraph represents an object; each directed edge indicates the dependency of one object on another. The dependency can take many forms. For example, a Relative Point depends on another point object for its location. A B-spline Curve depends on each of the point objects which are its vertices. A Lofted Surface depends on each of the curve objects through which it is lofted, and it also depends, in turn, on each point object used in the definition of those curves. Dependency can extend to many levels. An object can depend on many other objects, and can have many other objects dependent on it.

Some objects may be defined in an absolute sense, having no dependency on any others for example, an Absolute Point is specified solely by its coordinates x, y, z.

It is useful to classify and define entities first in terms of their dimensionality, and second in terms of their primary dependencies:

Points are zero-dimensional objects

An Absolute Point depends on nothing.

A Relative Point depends on another point.

A Bead is a point constrained to lie on a curve.

A Magnet is a point constrained to lie on a surface.

A Ring is a point constrained to lie on a snake.

Curves are one-dimensional objects.

A Line depends on two points.

An Arc depends on three points.

A B-spline Curve depends on two or more points.

A C-spline Curve depends on two or more points.

Surfaces are two-dimensional objects.

A Translation Surface depends on two curves.

A Ruled Surface depends on two curves.

A Revolution Surface depends on one curve and two points.

A C-Lofted Surface depends on two or more curves.

A Blended Surface depends on three or more curves.

A B-spline Surface depends on an array of points.

Snakes are one-dimensional objects, parametric curves constrained to lie on a parametric surface. Any snake depends on its surface.

A Line Snake Depends on two magnets or rings.

A Goedesic Snake depends on two magnets or rings.

An Arc Snake depends on three magnets or rings.

A B-Spline Snake depends on two or more magnets or rings.

A C-Spline Snake depends on two or more magnets or rings.

The above list of entities is intended to be illustrative, but not necessarily complete. Extension of this system of entities in a now obvious way to include parametric solids (three-dimensional objects with parameters u, v, w), and point, curve and surface entities located relative to a solid by use of the solid's parametric coordinate system, is specifically contemplated.

A different useful classification may be made in terms of the dependency role each entity class can fulfill:

When a point called for, any point entity may be used.
When a bead is called for, only a bead may be used.
When a magnet is called for, a magnet or ring may be used.
When a ring is called for, only a ring may be used.
When a curve is called for, any point, curve or snake entity may be used.
When a snake is called for, a snake, magnet or ring may be used.
When a surface is called for, only a surface may be used.

Use is made of parametric coordinates as part of the data for some of these entities. For example, a curve may be parameterized with a parameter t which varies from 0 at one end to 1 at the other. An Absolute Bead can then be located by specifying the curve and a specific value for t. A surface may be parameterized with parameters u,v each of which varies independently from 0 to 1. An Absolute Magnet can then be located by specifying the surface and a specific pair of parameter values for u, v. A snake is a parametric curve in the two-dimensional u,v parameter space of its supporting surface.

One useful form of representation of a logical model is a text description having one record for each object. The object record includes the entity type, the object name, various objects attributes such as color and visibility, and any variable data required to actualize the object, presented in a predefined order peculiar to the entity. For example, the following set of five records is the solution to the "line A–line B" problem discussed above, according to the invention:

```
AbsPoint A1    14  1  1.  1.  3.;
AbsPoint A2    14  1  2.  1.  3.;
Line line_A    13  1  A1  A2;
AbsPoint B2    14  1  2.  3.  3.;
Line line_B    13  1  A2  B2;
```

This model contains 5 objects; 3 Absolute Points (named 'A1', 'A2', 'B2') and 2 Lines (named 'line_A', line_B'). The numbers 14 and 13 are color specifiers, and the 1's that follow them specify visibility. This data clearly records the intention that 'line_B' start where 'line_A' ends, viz. at point 'A2'. The dependency of 'line_B' on point 'A2' creates the durable connection.

The following record adds one more object to this example:

AbsBead bead_B 12 1 line-B 0.7;

This creates a visible point, of color 12, constrained to remain on 'line_B' at a parameter value of 0.7, i.e., 70% of the way from point 'A2' to point 'B2'. Following any change in 'line_A', 'bead_B' will still lie on 'line_B' in the same relative location. The dependency of 'bead B' on 'line_B' creates the durable relationship.

For purposes of output or display, an absolute model will be computed from the logical model. For this example, the absolute model would consist of:

a point, color 14 at (1., 1., 3.)
a point, color 14, at (2., 1., 3.)
a line, color 13, from (1., 1., 3.) to (2., 1., 3.)
a point, color 14, at (2., 3., 3.)
a line, color 13, from (2., 1., 3.) to (2., 3., 3.)
a point, color 12, at (2., 2.4, 3.)

Now suppose that the example model is changed by moving point 'A2' to a new position (2., 1., 4.). This is accomplished by changing one element in one record of the local model:

```
AbsPoint A2    14  1  2.  1.  4.;
```

Following this change, the updated absolute model would consist of:

a point, color 14 at (1., 1., 3.)
a point, color 14, R (2., 1., 4.)
a line, color 13, from (1., 1., 3.) to (2., 1., 4.)
a point, color 14, at (2., 3., 3.)
a line, color 13, from (2., 1., 4.) to (2., 1., 3.)
a point, color 12, at (2., 2.4, 3.3)

The connection of 'line_A' and 'line_B' has been automatically maintained; 'bead_B' is still located on 'line_B' and in the same relative position, i.e. at 70% of the length of 'line_B'. This brief example illustrates the automatic updating of the model that is made possible by utilization of the diagraph data structure of dependencies.

The internal or external representation of the data structure may well be different from this text representation, but will nevertheless encode the dependency information in a manner that is logically equivalent to a diagraph.

The second objective (supporting a variety of curve and surface types) is achieved by a special organization of the program instructions. According to the invention, all point objects may be accessed through a single routine Point, whose input parameter is the name or index of a point object, and which returns the x, y, z coordinates of the object. Within point, a case statement branches to separate routines for evaluating each specific point entity. It is essential that Point be programmed in a recursive fashion, so that it can call itself, or be called by routines that have been called by it.

Similarly, all curve objects may be accessed through a single routine Curve whose arguments are the name or index of a particular curve, and a list of t parameter values, and whose return parameters include a tabulation of x, y, z coordinates. Within Curve, a case statement branches to separate routines for evaluating each specific curve entity. It is likewise essential that Curve be programmed in a recursive fashion, since the data for any curve may depend on another curve. To the program module that calls Curve, all types of curves are interchangeable; you give it a t, it gives you back a point x, y, z. To support a new curve entity, it is only necessary to define the data required for that entity; add one case to the Curve routine; and add one routine that evaluates the new entity.

In like fashion, there can be a single recursive routine Snake whose arguments are the name or index of a particular snake object, and a list of t parameter values, and whose return parameters include a tabulation of x, y, z coordinates. If snakes are treated as curves in the two-dimensional u, v, parameter space of the surface, then addition of a new curve entity automatically adds a new snake entity of the same type. Maintaining this correspondence of curve and snake types is advantageous since the user then need not learn and remember separate properties for curves and snakes.

In the like fashion, there can be a single recursive routine Surface shows arguments are the name or index of a particular surface object, and vectors of u and v parameter values, and whose return parameters include a tabulation of x, y, z coordinates. To support N surface types, the programming effort is only proportional to N, rather than N squared.

The third objective (avoidance of surface-surface intersection and trimming) is achieved by utilizing the dependency relationships disclosed above, and providing certain generally useful snake and surface entities. Two distinct problems are addressed here: (1) forcing two surface objects Y and Z to accurately share a common edge, and (2) forcing one surface object Z to end accurately on another surface object Y, along a curve which is not necessarily an edge of Y.

According to the invention, durable common edges between surfaces may be achieved by using common data to define the adjoining edges. For example, if the two surfaces are blended surfaces, whose data includes boundary curves, all that is required is to use the same curve object for the corresponding edges of the two surfaces. Two lofted surfaces will accurately join in the loft direction if their corresponding Master Curves have common endpoints along the edges where they adjoin, The SubCurve entity, which creates a new curve identical to the portion of a specified existing curve between two specified beads, allows construction of common edges even where commonality does not extend along a complete edge of one or both surfaces.

According to the invention, a surface Z having an edge which accurately and durably lies on another surface Y can be achieved by defining a snake S on Y, then using S for an edge curve in the subsequent specification of Z. This arrangement also provides an alternative solution for common edges, when S is specified to be a Line Snake lying along part or all of one edge of Y.

BRIEF DESCRIPTION OF THE DRAWINGS

FIG. 2, Absolute Point and Relative Point; FIG. 3, Absolute Bead and Relative Bead; FIG. 4, Absolute Magnet and Relative Magnet; FIG. 5, Absolute Ring and Relative Ring.

FIG. 6, Line and Arc curves; FIG. 7, B-Spline Curve; FIG. 8, C-Spline Curve; FIG. 9, Sub-curve; FIG. 10, Relative Curve.

FIG. 11, Ruled Surface; FIG. 12, Translation Surface; FIG. 13, Revolution Surface; FIG. 14, Blended Surface; FIG. 15, C-Lofted Surface; FIG. 16, B-spline Surface; FIG. 17, Sub-Surface; FIG. 18, Relative Surface.

FIG. 19, Line Snake; FIG. 20, Arc Snake; FIG. 21, B-spline Snake; FIG. 22, C-spline Snake; FIG. 23, Sub-Snake, FIG. 24, Relative Snake.

FIG. 27 shows an example application.

DETAILED DESCRIPTION OF THE PREFERRED EMBODIMENT

Figure 1:
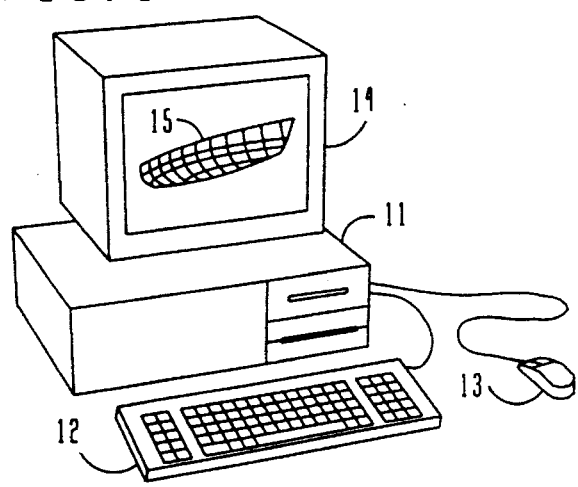
FIG. 1 shows a computer system having a central processing unit and disk memory, keyboard, mouse, and monitor, on which is displayed a 3-dimensional geometric model as a wireframe.

One preferred embodiment of the invention is a computer program operating on a suitable computer system such as an IBM-PC compatible or engineering workstation with a high-resolution color graphics display. The input device can be either a keyboard or a mouse. The graphics display is used primarily to display wireframe images of the model in perspective and/or orthogonal views. Controls are provided so the user can freely rotate, zoom or pan to select appropriate views. Alternative screen windows can show the u, v, parameter space of a surface; outline-form listings of objects and their dependencies; and the text form of the logical model. FIG. 1 shows a computer system having a central processing unit and disk memory 11, keyboard 12, mouse 13, and monitor 14, on which is displayed a 3-dimensional object as a wireframe 15.

In the graphic display, a visible point object is displayed as a small circle. A visible line, curve, or snake object is represented as a polyline with a user-selectable number of subdivisions. A visible surface object is displayed as a mesh of parameter lines having a user-selectable number of subdivisions in each parameter direction. With more advanced graphic display hardware, surface objects may be rendered as solids with hidden lines and surfaces removed.

Figure 2:
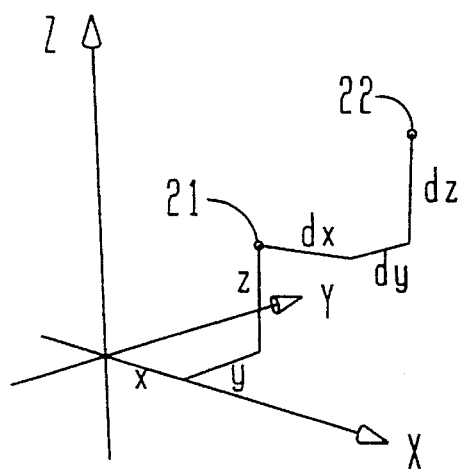
FIGS. 2 to 5 illustrate point objects.
Figure 3:
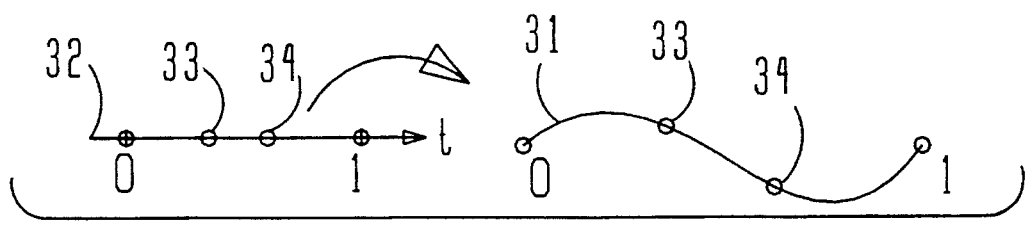

All objects have a color attribute; this can select one color from a palette of 16. All objects have a visibility attribute; this is a 16-bit integer in which the bits have different significance for different classes of entities, as follows:
points:
    bit 1: point is visible curves, snakes:
    bit 1: polyline is visible
    bit 2: polygon is visible
    bit 3: tick-marks displayed at uniform parameter intervals surfaces:
    bit 1: parameter lines in u-direction are visible
    bit 2: parameter lines in v-direction are visible
    bit 4: boundary is visible
The following is a list of entities supported in the preferred embodiment:
Point class:
Absolute Point (AbsPoint): x, y, z
    x, y, z are the absolute coordinates of the point.
Relative Point (RelPoint): point, cx, dy, dz
    dx, dy, dz are the coordinate offsets from 'point' FIG. 2 shows an absolute Point 21 and a Relative Point 22 located in a Cartesian coordinate system.
Absolute Bead (AbsBead): curve, t
    t is an absolute parameter value on 'curve'
Relative Bead (RelBead): bead, dt
    dt is the parameter offset from 'bead' FIG. 3 shows a curve 31 in 3-space mapped from a 1-D parameter space 32, an Absolute Bead 33, and a Relative Bead 34 located in both spaces.
Absolute Magnet (AbsMagnet): surface, u, v,
    u, v are the absolute parameters on 'surface'

Figure 4:
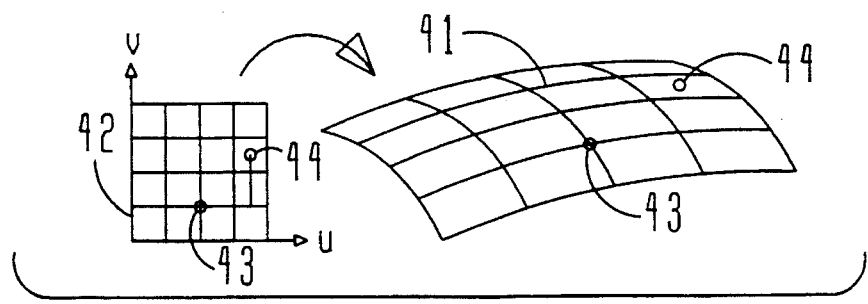

Relative Magnet (RelMagnet): magnet, du,dv du, dv are the parameter offsets from 'magnet' FIG. 4 shows a surface 41 in 3-space mapped from a 2D parameter space 42, an Absolute Magnet 43, and a Relative Magnet 44 located in both spaces.

Absolute Ring (AbsRing): snake, t t is an absolute parameter value on 'snake'

Figure 5:
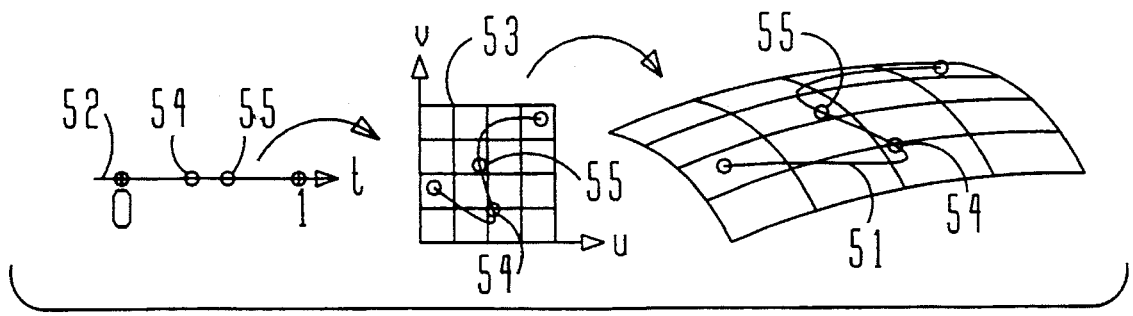

Relative Ring (RelRing): ring, dt dt is a parameter offset from 'ring' FIG. 5 shows a snake 51 in 3-space mapped from a 1-D parameter space 52 through a 2D parameter space 53, and an Absolute Ring 54 and a Relative Ring 55 located in all three spaces.

Curve class:

(All curves are parameterized from 0. to 1.)

Line (Line): point1, point2

The Line is a straight line from 'point1' ($x_1$) to 'point2' ($x_2$):

$$x(t)=(1-t)\,x_1+t\,x_2$$

Arc (Arc): point1, point2, point3

The Arc is a circular arc interpolating the three points in sequence.

Figure 6:
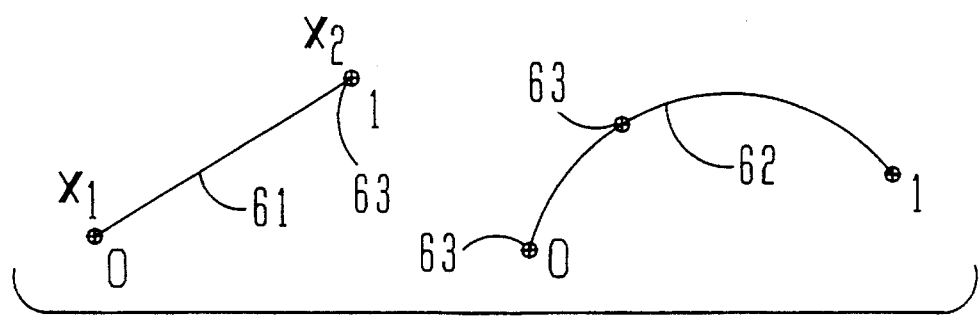
FIGS. 6 to 10 illustrate curve objects.

FIG. 6 illustrates Line 61 and Arc 62 objects, dependent on 2 and 3 point objects 63 respectively.

B-spline curve (BCurve): type, point1, point2, ... pointN
type gives the B-spline order: 1=linear, 2=quadratic, etc.
The named points are the vertices in sequence.

$$x(t) = \sum_{i=1}^{N} x_i B_i(t)$$

Figure 7:
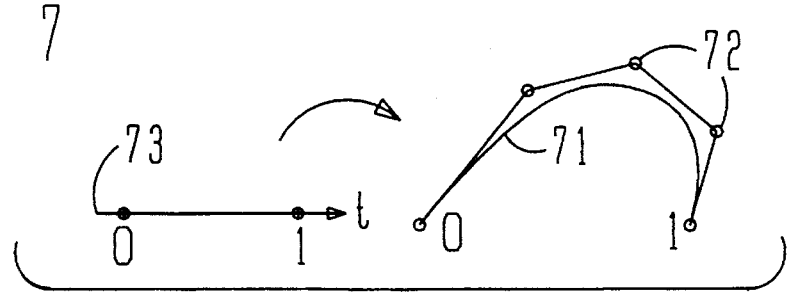

FIG. 7 illustrates a B-spline Curve object 71, dependent on a multiplicity of point objects 72; and its 1-D parameter space 73.

C-spline curve (CCurve): point1, point2, ... pointN

The named points are interpolated in sequence.

Figure 8:
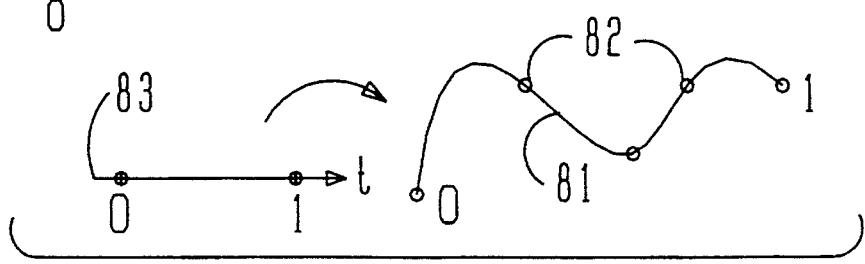

The curve is a parametric cubic spline with chord-length parameterization, knots at the data points, and not-a-knot end conditions, FIG. 8 illustrates a C-Spline Curve object 81, dependent on a multiplicity of point objects 82; and its 1-D parameter space 83.

Sub-curve (SubCurve): curve, bead1, bead2

The sub-curve y(t) is the portion of curve x(s) from 'bead1' (parameter $s_1$) to 'bead2' (parameter $s_2$):

$$y(t)=x[(1-t)s_1+t\,s_2]$$

Figure 9:
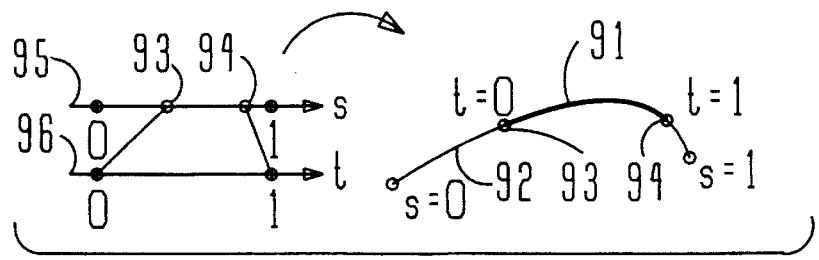

FIG. 9 illustrates a Sub-curve object 91, which is a portion of curve object 92 between two bead objects 93, 94; and the 1-D parameter spaces 95, 96 of the curve and the subcurve respectively.

Relative curve (RelCurve): curve, point1, point 2

The relative curve x(t) is formed from curve y(t) and the two points $x_1$, $x_2$ by the linear transformation:

$$x(t)=y(t)+(1-t)\,[x_1-y(0)]+t\,[x_2-y(1)]$$

Figure 10:
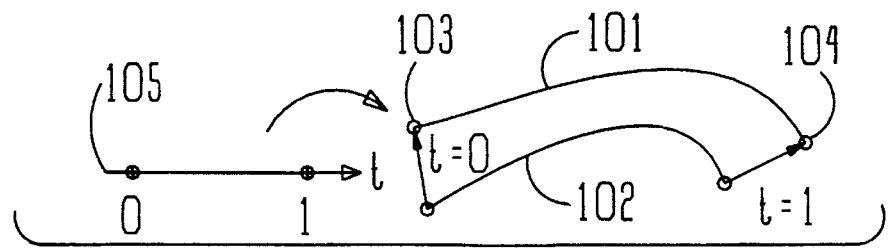

FIG. 10 illustrates a Relative Curve object 101, dependent on a curve object 102 and two point objects 103, 104; and its 1-D parameter space 105.

Surface class:

(All surfaces are parameterized from 0 to 1 in both u and v directions)

Ruled surface (RuledSurf): curve1, curve2

The surface is formed from the two curves y(t), z(t) by linear interpolation:

$$x(u,v)=(1-v)\,y(u)+v\,z(u)$$

Figure 11:
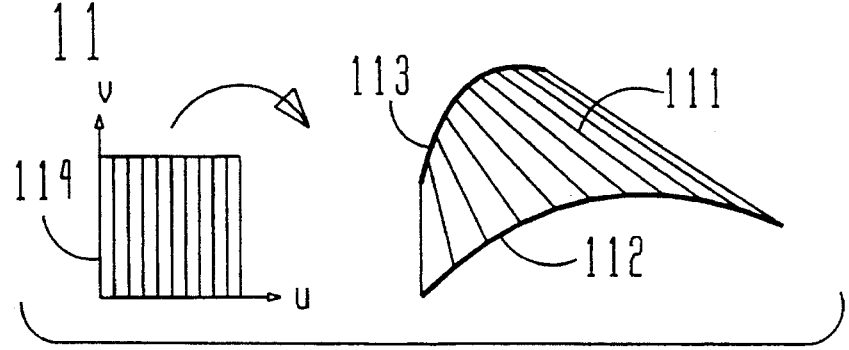
FIGS. 11 to 18 illustrate surface objects.

FIG. 11 illustrates a Ruled Surface object 111, dependent on two curve objects 112, 113; and its 2-D parameter space 114.

Translation surface (TranSurf): curve1, curve2

The surface is formed from the two curves y(t), z(t) by addition:

$$x(u,v)=y(u)+z(v)-z(0)$$

Figure 12:
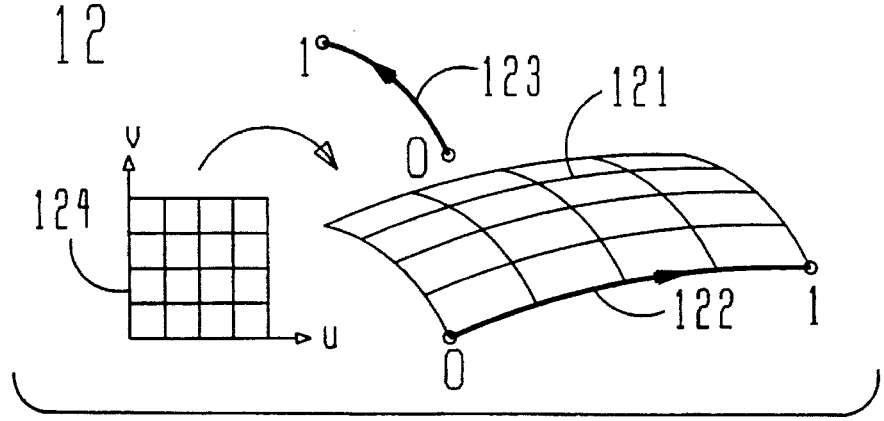

FIG. 12 illustrates a Translation Surface object 121, dependent on two curve objects 122, 123, and its 2-D parameter space 124.

Revolution surface (RevSurf): curve, point1, point2, angle1, angle2

The surface point at u, v is constructed by taking a point y(v) from 'curve' then rotating it through an angle $\Theta=(1-u)\Theta_1+u\,\Theta_2$ about the axis line from 'point1' to 'point2'.

Figure 13:
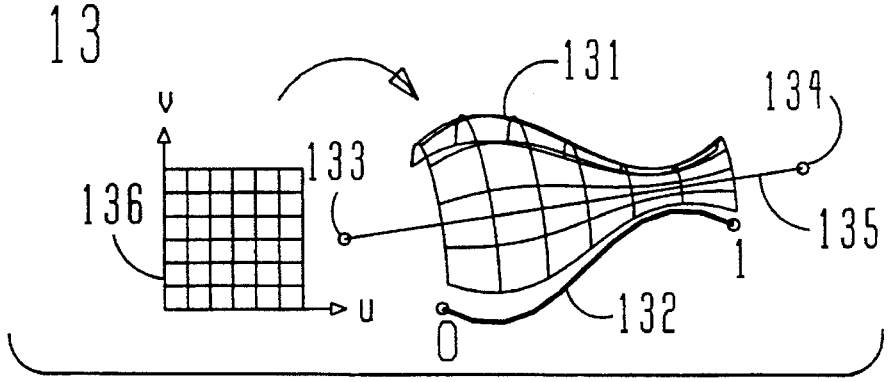

FIG. 13 illustrates a Revolution Surface object 131, dependent on one curve object 132 and two point objects 133, 134 which define an axis 135; and its 2-D parameter space 136.

Blended surface (BlendSurf): curve1, curve2, curve3, curve4

The surface is a bilinear Coons patch constructed from the four curves. If the four curves are oriented end-to-end as in FIG. 14, the equation for locating a surface point is:

$$\begin{aligned}x(u,v) =\ & (1-v)\,x_1(u)+v\,x_3(1-u)+\\ & (1-u)\,x_4(1-v)+u\,x_2(v)-\\ & (1-u)(1-v)\,[x_1(0)+x_4(1)]/2-\\ & u(1-v)\,[x_1(1)+x_2(0)]/2-\\ & u\,v\,[x_2(1)+x_3(0)]/2-\\ & (1-u)\,v\,[x_3(1)+x_4(0)]/2\end{aligned}$$

Figure 14:
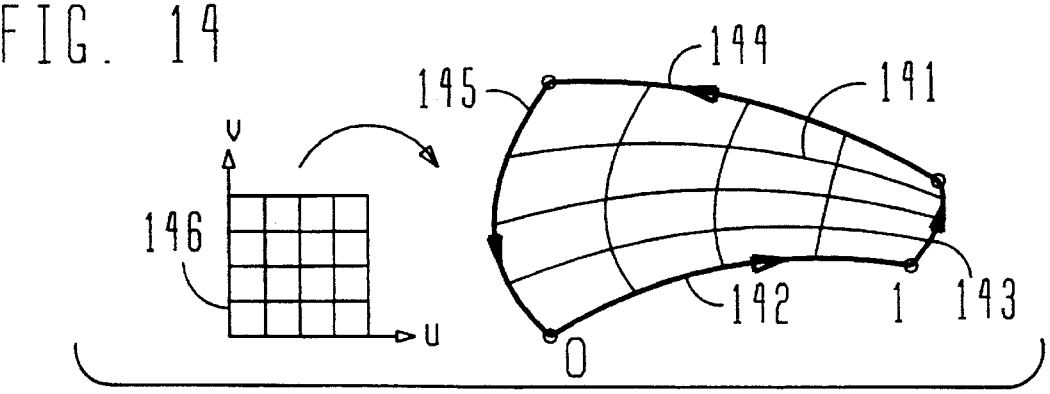

FIG. 14 illustrates a Blended Surface object 141, dependent on four curve objects 142, 143, 144, 145; and its 2-D parameter space 146.

C-lofted surface (CLoftSurf): curve1, curve2, ... curveN

A surface point x(u,v) is obtained in three stages: (1) from each curve i take the point $x_i(u)$; (2) form the C-spline curve which interpolates the $x_i(u)$ in sequence; (3) evaluate the C-spline at parameter v.

Figure 15:
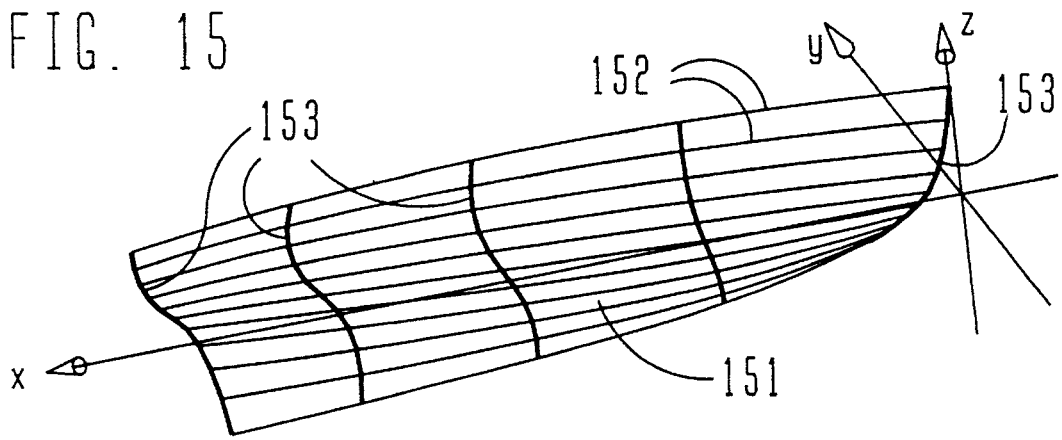

FIG. 15 illustrates a C-Lofted Surface object 151, consisting of an infinitude of C-splines 152 interpolating several curve objects 153.

B-spline tensor-product surface (BSurf): typeU, typeV, N, M, point11, point12, ... pointNM typeU, typeV give the B-spline orders for u and v directions. N, M are numbers of vertices in u, v directions. point11, point12, ... pointNM are a rectangular net of control points.

$$x(u,v) = \sum_{i=1}^{N} \sum_{j=1}^{M} x_{ij} B_i(u) B_j(v)$$

Figure 16:
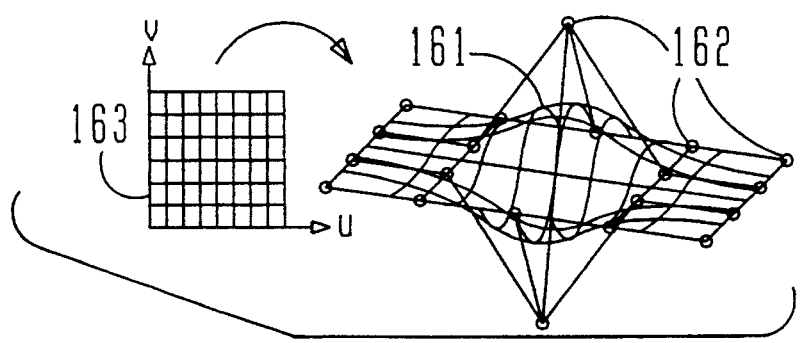

FIG. 16 illustrates a B-spline Surface object 161, dependent on an array of point objects 162; and its 2-D parameter space 163.

Sub-surface (SubSurf): surface, snake1, snake2, snake3, snake4

The sub-surface is a portion of surface y(p,q) bounded by the four snakes $w_1, w_2, w_3, w_4$ in end-to-end sequence.

$$x(u,v) = y(w) \text{ where}$$

-continued $$w = \{p,q\} = (1-v) w_1(u) + v w_3(1-u) +$$
$$(1-u) w_4(1-v) + u w_2(v) -$$
$$(1-u)(1-v) [w_1(0) + w_4(1)]/2 -$$
$$u(1-v) [w_1(1) + w_2(0)]/2 -$$
$$u v [w_2(1) + w_3(0)]/2 -$$
$$(1-u) v [w_3(1) + w_4(0)]/2$$

Figure 17:
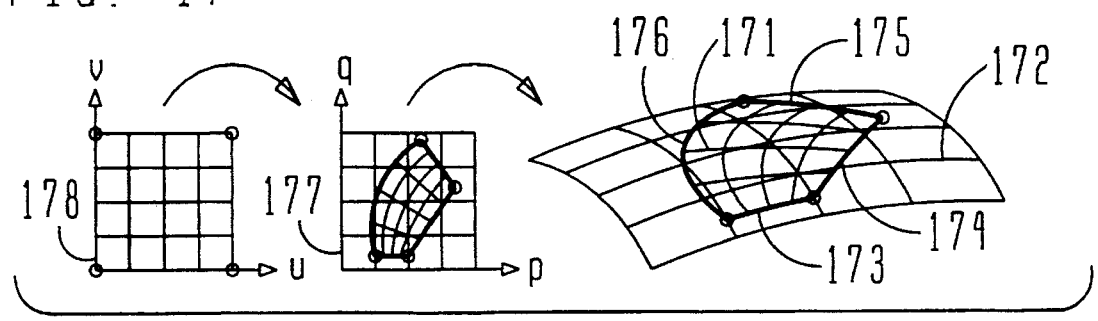

FIG. 17 illustrates a Sub-surface object 171, dependent on a surface object 172, four snake objects 173, 174, 175, 176; and the 2-D parameter spaces 177, 178 of the surface and the sub-surface respectively.

Relative surface (RelSurf): surface, point1, point2, point3, point4

The relative surface $x(u,v)$ is formed from surface $y(u,v)$ and the four corner points $x_1$, $x_2$, $x_3$, $x_4$ by the bilinear transformation:

$$x(u,v) = y(u,v) + (1-u)(1-v) [x_1 - y(0,0)] +$$
$$u(1-v) [x_2 - y(1,0)] +$$
$$v(1-u) [x_3 - y(1,1)] +$$
$$u v [x_4 - y(0,1)]$$

Figure 18:
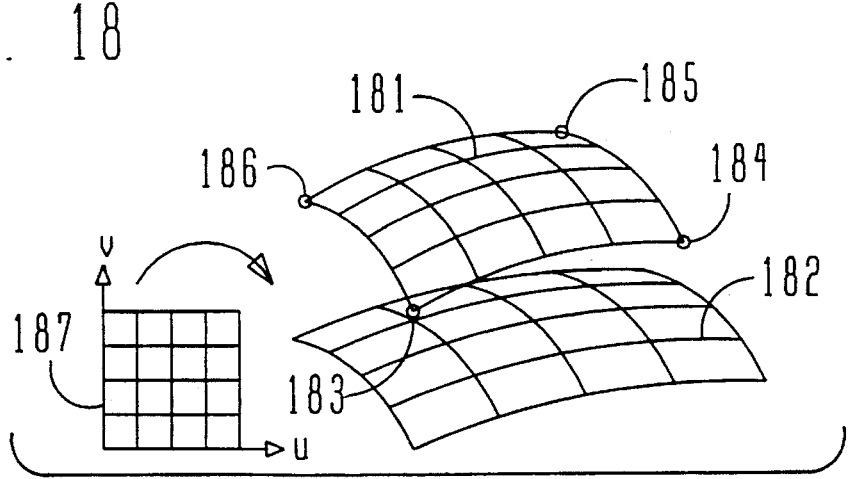

FIG. 18 illustrates a Relative Surface object 181, dependent on a surface object 182 and four point objects 183, 184, 185, 186; and its 2-D parameter space 187.

Snake class: (All snakes are parameterized from 0 to 1. A snake is evaluated by first locating a point $w=\{u,v\}$ in the parameter space of the surface, then evaluating the surface with those parameter values.) Line snake (LineSnake): magnet1, magnet2

The LineSnake is a straight line in u; v parameter space from 'magnet1' ($w_1=\{u_1, v_1\}$) to 'magnet2' ($w_2=\{u_2, v_2\}$):

$$w(t)=(1-t) w_1+t w_2$$

Figure 19:
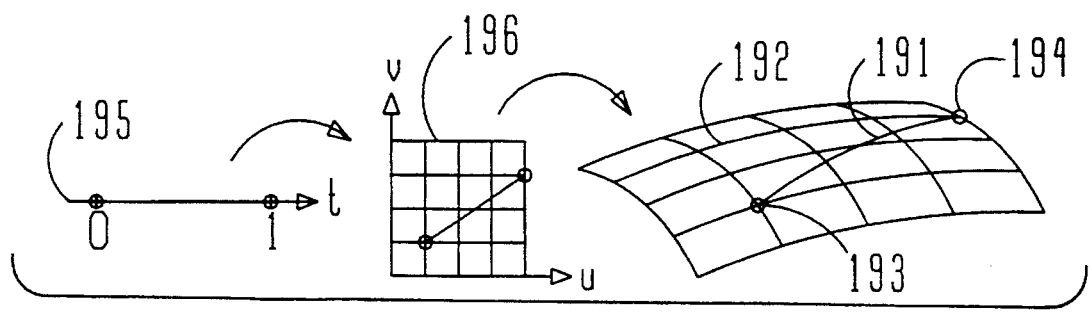
FIGS. 19 to 24 illustrate snake objects.

FIG. 19 illustrates a Line Snake object 191, dependent on a surface object 192 and two magnet objects 193, 194; and the 1-D parameter space 195 of the snake; and the 2-D parameter space 196 of the surface.

Arc snake (ArcSnake): magnet1, magnet2, magnet3

The ArcSnake is a circular arc in u, v parameter space interpolating the three magnets.

Figure 20:
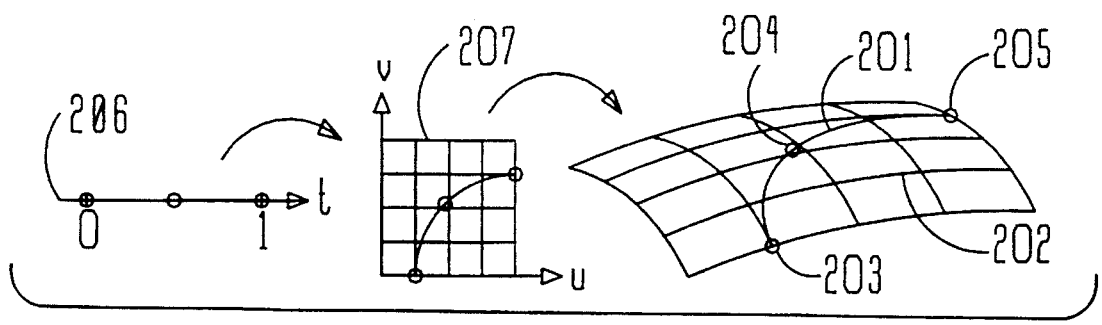

FIG. 20 illustrates an Arc Snake object 201, dependent on a surface object 202 and three magnet objects 203, 204, 205; and the 1-D parameter space 206 of the snake; and the 2-D parameter space 207 of the surface.

B-spline snake (BSnake): type, magnet1, magnet2, . . . magnetN type gives the B-spline order: 1=linear, 2=quadratic, etc. The named magnets are the vertices in sequence.

$$w(t) = \sum_{i=1}^{N} w_i B_i(t)$$

Figure 21:
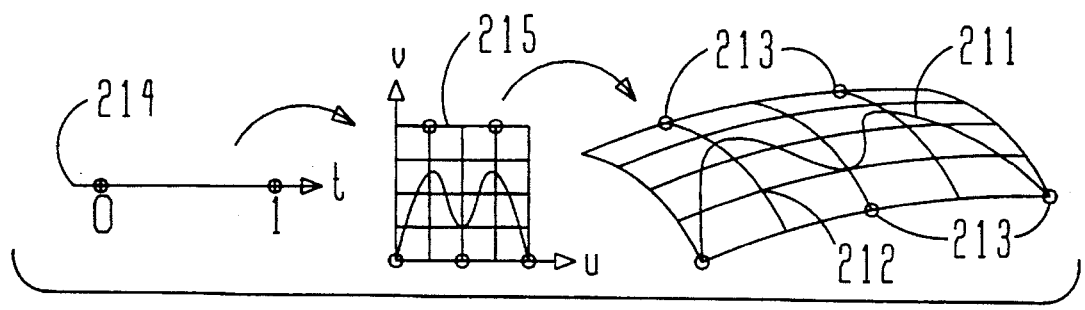

FIG. 21 illustrates a B-spline Snake object 211, dependent on a surface object 212 and multiple magnet objects 213; and the 1-D parameter space 214 of the snake; and the 2-D parameter space 215 of the surface.

C-spline snake (CSnake): magnet1, magnet2, . . . magnetN

The named magnets are interpolated in sequence.

Figure 22:
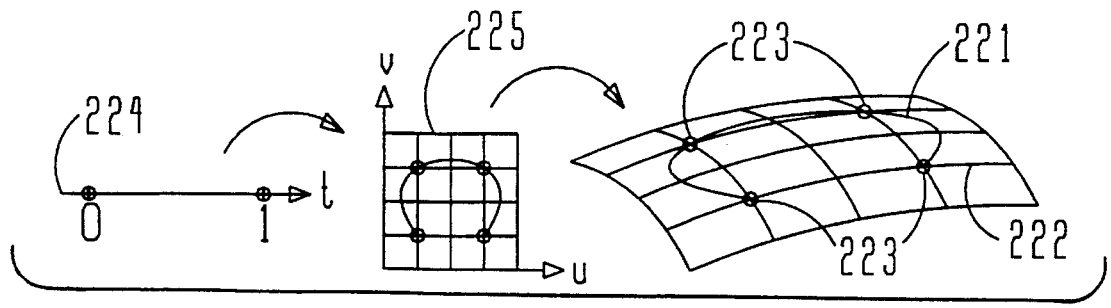

The snake is a parametric cubic spline in the u, v parameter space with chord-length parameterization, knots at the data points, and not-a-knot end conditions. FIG. 22 illustrates a C-spline Snake object 221, dependent on a surface object 222 and multiple magnet objects 223; and the 1-D parameter space 224 of the snake; and the 2-D parameter space 225 of the surface.

Sub-snake (SubSnake): snake, ring1, ring2

The sub-snake $w(t)$ is the portion of 'snake' $p(s)$ from 'ring1' (parameter $s_1$) to 'ring2' (parameter $s_2$):

$$w(t)=p[(1-t) s_1+t s_2]$$

Figure 23:
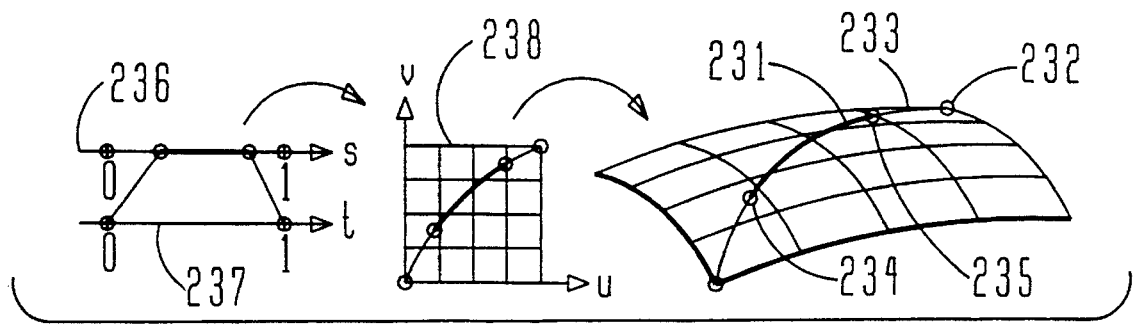

FIG. 23 illustrates a Sub-snake object 231, dependent on a surface object 232, a snake object 233, and two ring objects 234, 235; and the 1-D parameter spaces 236, 237 of the snake and sub-snake respectively; and the 2-D parameter space 238 of the surface.

Relative snake (RelSnake): snake, magnet1, magnet2

The relative snake $w(t)$ is formed from 'snake' $p(t)$ and the two magnets $m_1$, $m_2$ by the linear transformation:

$$w(t)=p(t)+(1-t) [m_2-p(0)]+t [m_2-p(1)]$$

Figure 24:
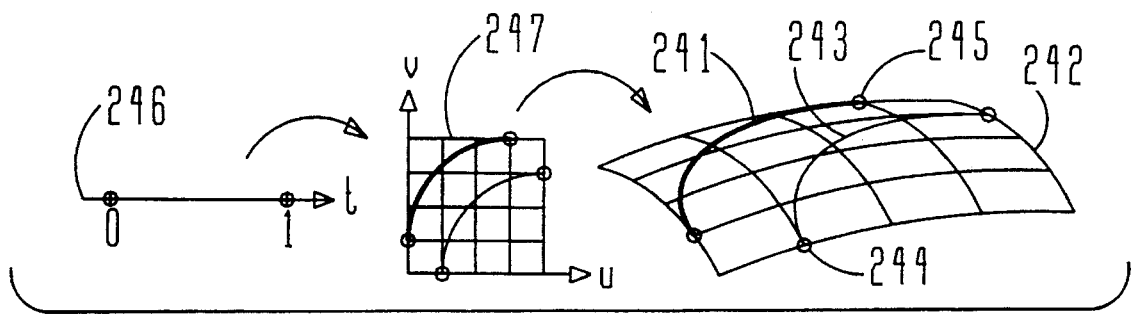

FIG. 24 illustrates a Relative Snake object 241, dependent on a surface object 242, a snake object 243, and two magnet objects 244, 245; and the 1-D parameter space 246 of the relative snake; and the 2-D parameter space 247 of the surface.

Logical models are stored as files in disk memory, in a text format similar to that previously outlined, but with some additional numerical parameters specifying polyline subdivisions for display. Each object is represented by a single text record beginning with the entity keyword indicated in parentheses in each of the above entity definitions. The keyword is followed by the object name, and color and visibility indices. Any curve or snake object will then have an integer telling the number of subdivisions desired for the polyline representing it in the display; any surface object will have two integers specifying the number of subdivisions in the u and v directions for the polyline mesh representing it in the display. Beyond this point, the required data for most entities is different, as indicated in the entity definitions above. The text file is terminated by the keyword "End". Remarks can be included in the text file by use of the keyword "Rem".

Figure 25:
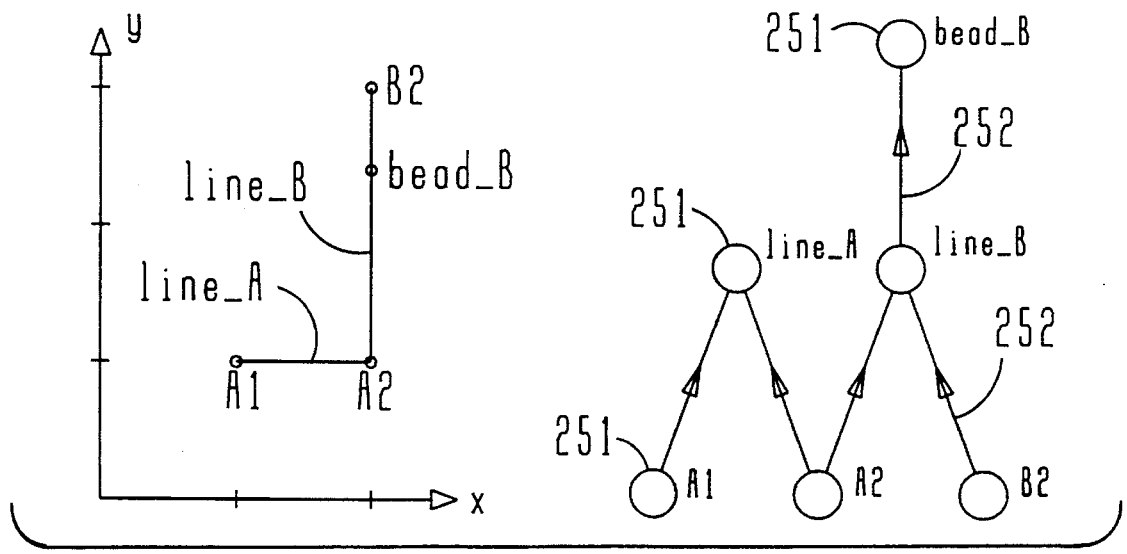
FIG. 25 is an example of the dependency diagraph for a simple model.

Internal to the program, objects are referenced by serial numbers corresponding to their sequence in the input data file, or sequence of creation. Requiring that all references be to previously defined objects is a simple way to eliminate the possibility of circular dependencies (digraph cycles). The organization of internal storage of the logical model includes a linked-list data structure representing the dependency digraph, to be used during updates of the absolute model. FIG. 25 is a digraph representing the dependencies in the "line A–line B" example developed in a previous section. The nodes 251 represent objects, and the edges 252 represent their dependencies.

The program has user-controlled capabilities for reading and writing logical-model data files in the appropriate text format, and for detecting and reporting errors and inconsistencies in a data file during read operations. The program can also read and display, simultaneous with displaying a model, one or more files representing 3-dimensional wireframes. The program can also write a 3-dimensional wireframe file of the absolute model currently displayed, or a 2-dimensional wireframe file of the current view.

Interactive capabilities are provided for creating, editing and deleting objects. Limited capabilities are provided for appropriate transmutations of objects to a different entity type; for example, any point object can be transmuted into an absolute point. In all these activities the program performs consistency checks and enforces rules ensuring the integrity of the digraph data structure. For example: all required dependencies have to be fulfilled before a newly created object is accepted into the logical model; an object cannot be deleted until all of its dependents have been deleted; circular dependencies are not permitted.

Figure 26:
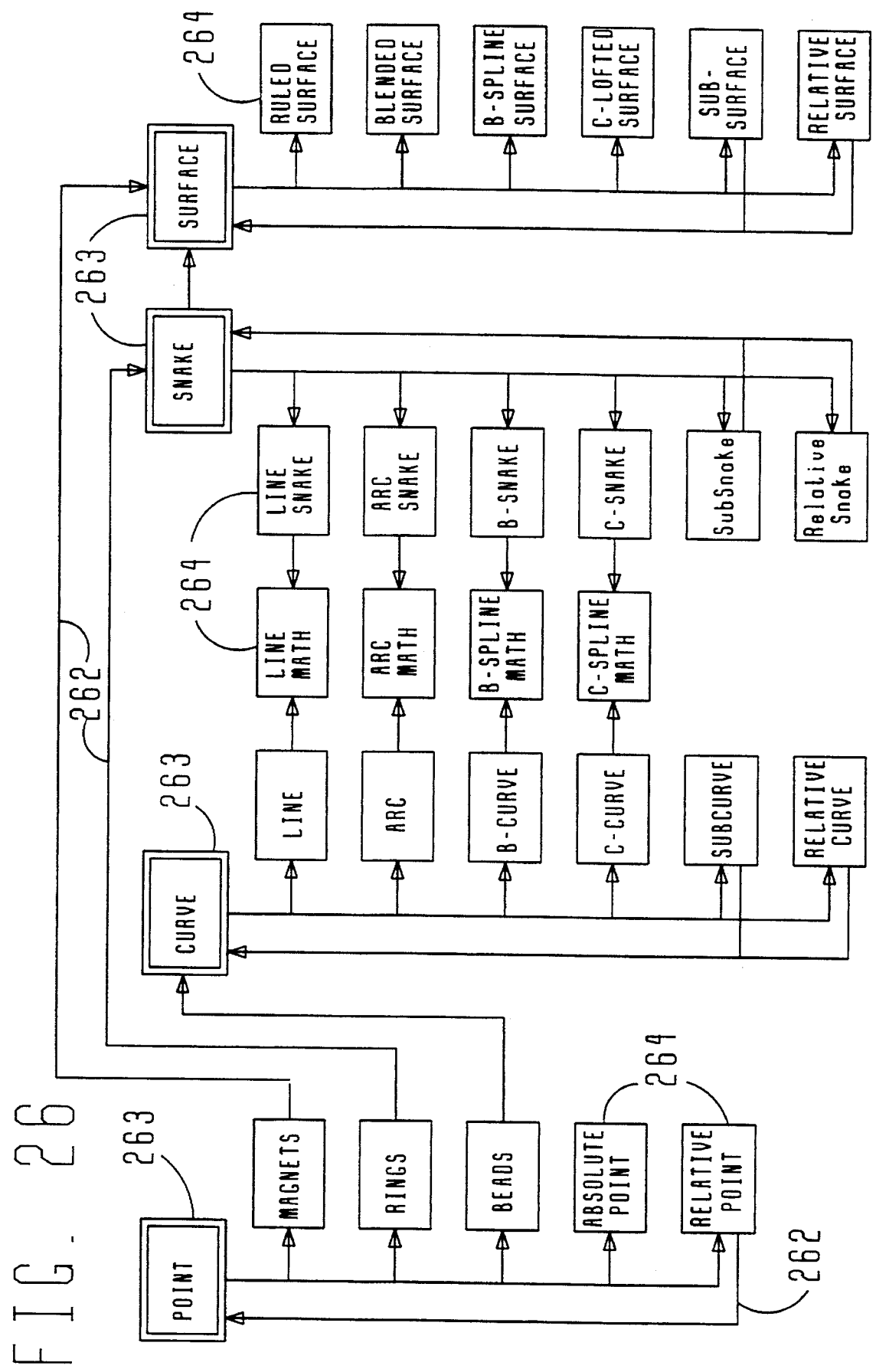
FIG. 26 illustrates a possible organization of program modules which accomplishes the purposes of the invention.

FIG. 26 shows a possible organization of program modules which accomplishes the purposes of the invention. Each box 263, 264 represents a subroutine; each arrow 262 represents a subroutine call, with the arrow directed from the calling module to the called module.

The four special modules ("primary modules", 263) labeled "Point", "Curve", "Snake" and "Surface" are the interface to any application program requiring absolute geometric information from the model. These have input and output argument as follows:

Point—in: name (or index) of a point object out: absolute coordinates x, y, z

Curve—in: name (or index) of a curve object list of t parameter values out: list of point coordinates x, y, z Snake—in: name (or index) of a snake object list of t parameter values out: list of point coordinates x, y, z Surface—in: name (or index) of a surface object
list of u parameter values
list of v parameter values out: array of point coordinates x, y, z (An input list of parameter values may have only a single entry, if only one point needs to be evaluated.) The other modules ("secondary modules", 264) illustrated are not intended to be called from an application, being called only by the primary modules, as indicated by arrows, or in some cases by other secondary modules.

Module "Point" determines what kind of point object it is evaluating and branches to the secondary routine, as indicated. Similarly, "Curve" "Snake" and "Surface" are basically branches to their constituent secondary routines.

"Line" and "Line Snake" routines share a common "Line math" routine; similarly, the other curves and snakes share common math routines. The math routines are able to operate with either 2-D data (when called by a snake routine) or 3-D data (when called by a curve routine). It is obvious in FIG. 26 how easily a new parametric curve, snake, or surface entity can be added to the system; it requires only the addition of one secondary module implementing the new entity, and a small modification of one primary module, adding a branch to the new secondary module.

Evaluation of some entities requires calls to other primary modules, as indicated; for example, a bead requires evaluation of a curve; a snake requires evaluation of a surface.

Some recursive calls are apparent as cycles in FIG. 26. For example, to locate a relative point, the program first needs to locate the basis point, no matter what kind of point object the basis point is. Thus, "Relative Point" must be able to call "Point". Similarly, "SubCurve" and "Relative Curve" must be able to call "Curve"; "SubSnake" and "Relative Snake" must be able to call "Snake"; and "SubSurface" and "Relative Surface" must be able to call "Surface".

Other potentially recursive calls to the primary routines are needed, which are not here indicated by arrows, because the arrows showing all such possibilities would be too numerous. For example, "Line" "Arc" "B-Curve" and "C-Curve" all need to evaluate their supporting points, by a series of calls to "Point". "Line Snake", "Arc Snake", "B-Snake" and "C-Snake" need to evaluate the u,v parameters of each of their supporting magnet objects, by a series of calls to "Magnet" or "Ring". The several surface routines need to evaluate various point, curve or snake objects, according to their individual constitutions; these are all done through calls to the primary modules.

Further levels of recursion occur when, for example, one curve supporting the surface being evaluated is a snake on another surface. In this case the sequence of calls passes through "Surface" twice. It is easy to think up cases with arbitrarily long chains of dependency. All such recursive possibilities are accommodated by the program structure indicated in FIG. 26. Without recursion, the program complexity and size would grow extremely rapidly with the allowable depth of dependency; with recursion, only stack space is required to indefinitely extend the permitted depth of dependency.

EXAMPLE APPLICATION OF THE PREFERRED EMBODIMENT

Table 1 is a text representation of an example logical model utilizing a variety of point, curve and snake objects, and six interconnected surface objects of various types, as defined and outlined above. FIG. 27 is a wireframe representation of the resulting absolute model. The example comprises hull, deck and cabin surfaces for a 30-foot sailing yacht design.

The example model has six surface objects: 'hull' 271 and 'deck' 272 are C-lofted surfaces; 'cabin_fwd' 273, 'cabin_side' 274, and 'cabin_aft' 275 are ruled surfaces; and 'cabin_top' 276 is a blended surface. The surfaces all have visibility 2, which causes only the parameter lines in the v-direction to be displayed. Eleven transverse sections 277 through the model are also displayed for purposes of visualizing the shapes.

'hull' is a C-lofted surface with three B-spline master curves 'MCA', 'MCB', 'MCC', each having four absolute points as vertices. 'deck' also has three master curves; the first is the single point 'MCAV1' the other two are 3-vertex B-spline curves 'deck_beam' and 'transom'. The join 278 between 'hull' and 'deck' is accurate and durable because the C-splines at the adjoining edges on each surface use the same data points, viz 'MCAV1', 'MCBV1', 'MCCV1', and therefore are identical curves.

The three ruled surfaces 'cabin_fwd' 'cabin_side' 'cabin_aft' are constructed in a similar fashion to one another; each uses a snake on 'deck' as one edge, providing an accurate and durable join 279 to the 'deck' surface, and a relative curve dependent on that snake as the second (upper) edge. The three snakes on 'deck' join each other accurately and durably because they share common endpoint data, viz. magnets 'dm3' and 'dm5'. The three relative curves 'top_fwd' 'top_side' 'top_aft' also join each other accurately and durably because they are constructed using common end points, viz. relative points 'rp3' and 'rp5'. 'cabin_side' joins the other two surfaces accurately because its end rulings are the lines 'dm3'-'rp3' and 'dm5'-'rp5', which are identical to end rulings on the adjoining surfaces.

The blended surface 'cabin_top' joins the three ruled surfaces accurately because it uses their upper edge curves 'top_fwd', 'top_side', 'top_aft' as data. Its fourth side is a three-vertex C-spline 'top_ctr' which lies accurately in the centerplane because each of its vertices has a zero y coordinate.

The example model as now defined can easily be transformed into an extremely wide variety of alternative shapes by changing the coordinates of absolute points, the offsets of relative points, and the parameters of magnets. An example modification which affects all six surface is to increase the y coordinate of 'MCBV1'. Following any such change, the connectivity and relative positioning of the several surfaces is automatically preserved as the absolute model is updated.

TABLE 1

Text representation of logical model for the example
application.
(Entity keyword; name; color, visibility; variable entity
data)

```
Rem 3x4 cloft hull with deck and cabin for patent example
AbsPoint      MCAV1        14  1      0.00         0.00        3.60;
AbsPoint      MCAV2        14  1      1.00         0.00        1.41;
AbsPoint      MCAV3        14  1      2.50         0.00       -0.84;
AbsPoint      MCAV4        14  1      3.00         0.00       -0.90;
BCurve   MCA  12  1  20  2
         { MCAV1  MCAV2  MCAV3  MCAV4 };
AbsPoint      MCBV1        14  1     15.00         5.84        2.64;
AbsPoint      MCBV2        14  1     15.00         6.00        0.54;
AbsPoint      MCBV3        14  1     15.00         3.90       -1.20;
AbsPoint      MCBV4        14  1     15.00         0.00       -1.44;
BCurve   MCB  12  1  20  2
         { MCBVL  MCBV2  MCBV3  MCBV4 };
AbsPoint      MCCV1        14  1     30.00         3.50        2.76;
AbsPoint      MCCV2        14  1     30.90         3.50        1.41;
AbsPoint      MCCV3        14  1     31.70         2.50        0.22;
AbsPoint      MCCV4        14  1     31.70         0.00        0.22;
BCurve   MCC  12  1  20  2
         { MCCV1  MCCV2  MCCV3  MCCV4 };
CLoftSurf     hull  10  2  20  30  0  { MCA  MCB  MCC };
AbsPoint      transom0     14  1     29.80         0.00        3.00;
AbsPoint      transom1     14  1     29.80         1.75        3.00;
BCurve   transom  10  1  10  2
         { MCCV1  transom1  transom0 };
AbsPoint      deck_ctr     14  1     15.00         0.00        3.45;
AbsPoint      deck_mid     14  1     15.00         2.70        3.45;
         { MCBV1  deck_mid  deck_ctr };
CLoftSurf     deck  7  2  8  10
         { MCAV1  deck_beam  transom };
AbsMagnet     dm1          11  1     deck          1.00        0.27;
AbsMagnet     dm2          11  1     deck          0.63        0.27;
AbsMagnet     dm3          11  1     deck          0.35        0.30;
AbsMagnet     dm4          11  1     deck          0.20        0.50;
AbsMagnet     dm5          11  1     deck          0.20        0.70;
AbsMagnet     dm6          11  1     deck          1.00        0.70;
BSnake   footprint_fwd  11  1  10  2
         { dm1  dm2  dm3 };
BSnake   footprint_side  11  1  20  2
         { dm3  dm4  dm5 };
LineSnake  footprint_aft  11  1  10  dm5  dm6;
RelPoint      rp1          11  1     dm1           2.00        0.00    1.30;
RelPoint      rp3          11  1     dm3           2.00        0.00    1.10;
RelPoint      rp5          11  1     dm5          -0.20       -0.50    1.40;
RelPoint      rp6          11  1     dm6          -0.30        0.00    1.80;
RelPoint      rp7          11  1     deck_ctr  0.00            0.00    1.65;
RelCurve  top_fwd  11  1  10  footprint_fwd  rp1  rp3;
RelCurve  top_side  11  1  20  footprint_side  rp3  rp5;
RelCurve  top_aft  11  1  10  footprint_aft  rp5  rp6;
RuledSurf  cabin_fwd  11  2  10  1
         footprint_fwd  top_fwd;
RuledSurf  cabin_side  11  2  20  1
         footprint_side  top_side;
RuledSurf  cabin_aft  11  2  10  1
         footprint_aft  top_aft;
CCurve    top_ctr  11  1  10  2
         { rp1  rp7  rp6 };
BlendSurf  cabin_top  14  2  4  5
         { top_fwd  top_side  top_aft  top_ctr };
End
```

What is claimed is:

1. A method of computer aided design of geometric models constructed from a multiplicity of geometric elements such as points, curves and surfaces in a design space of two or more dimensions, said method comprising:

defining and supporting by computer implemented steps a set of geometric entities for use in constructing said geometric models, each of said geometric entities being an abstract geometric object type that is adapted to be actualized into one or more geometric objects, each of said geometric entities comprising data fields and requiring for its actualization into a corresponding geometric object filling specified data fields with data items of valid data types, wherein each corresponding geometric object is stored in said computer accessible memory as a corresponding data structure, each of said geometric entities representing a specific procedure for constructing one or more of said geometric objects from the values in said data fields;

said geometric entities including one or more point class entities, one or more curve class entities, and one or more surface class entities, wherein each of said point class entities is adapted to be actualized into one or more point class objects, each of said point class objects designating a zero-dimensional point in said design space, wherein each of said curve class entities is adapted to be actualized into one or more curve class objects, each of said curve class objects designating a one-dimensional continuous point set in said design space, wherein each of said surface class entities is adapted to be actualized into one or more surface class objects, each of said surface class objects designating a two-dimensional continuous point set in said design space;

identifying at least some of said geometric objects by corresponding unique object identifiers;

defining and supporting by computer implemented steps a plurality of relational entities among said set of geometric entities, each of said relational entities being adapted to be actualized into one or more corresponding relational objects, wherein each corresponding relational object is stored in said computer accessible memory as a corresponding data structure, wherein each of said relational entities and said corresponding relational objects has one or more object data fields, each of said object data fields being a data field whose valid data type is an object identifier of another geometric object, so as to enable logical specification of one or more relational objects having a dependency relationship upon one or more other geometric objects whose object identifiers are specified within the object data fields of said one or more relational objects;

wherein at least one of said relational entities is one of said curve class entities and has two or more data fields whose valid data type is an object identifier of a point class object;

wherein at least one of said relational entities is one of said surface class entities and has two or more data fields whose said valid data types include an object identifier of a point class object or a curve class object.

2. The method of claim 1 further comprising defining by computer implemented steps and storing in computer memory a logical geometric model made up of a collection of geometric objects that are actualized from said set of geometric entities, wherein said collection of geometric objects includes one or more relational objects, each of said relational objects being a geometric object actualized from one of said relational entities.

3. The method of claim 2 further comprising generating from said logical geometric model by computer implemented steps an absolute geometric model in terms of absolute coordinate geometry coordinates in the design space.

4. The method of claim 2 wherein said collection of geometric objects comprises a directed graph data structure identifying dependencies among said collection of geometric objects.

5. The method of claim 4 wherein the directed graph data structure is acyclic.

6. The method of claim 4 further comprising in response to a change of a particular geometric object that is part of the directed graph data structure, automatically updating other geometric objects in said geometric model in an order that is determined by said directed graph data structure.

7. The method of claim 1 wherein the step of defining and supporting a plurality of geometric entities comprises defining and supporting by computer implemented steps an absolute point entity which may be actualized into one or more absolute point objects, each of which has specified absolute coordinate values of a corresponding point in said design space, and wherein the step of defining and supporting a plurality of relational entities comprises defining and supporting by computer implemented steps a class of parametric curve entities, each of which may be actualized into one or more parametic curve objects, each of which depends on an ordered set of point class objects specified therein by object identifiers.

8. The method of claim 7 wherein the step of defining and supporting said plurality of relational entities comprises defining and supporting by computer implemented steps a relative point entity which may be actualized into one or more relative point geometric objects, each of which (1) depends on another point class object specified therein by an object identifier and (2) has specified coordinate value offsets from a point in design space that corresponds to the specified point class object on which it depends.

9. The method of claim 7 wherein the step of defining and supporting said plurality of relational entities comprises defining and supporting by computer implemented steps a line entity which may be actualized into one or more line geometric objects, each of which depends on two point class objects that are specified therein by object identifiers.

10. The method of claim 7 wherein the step of defining and supporting said plurality of relational entities comprises defining and supporting by computer implemented steps a B-spline parametric curve entity which may be actualized into one or more B-spline parametric curve objects, each of which depends on two or more point class objects specified therein by object identifiers.

11. The method of claim 7 wherein the step of defining and supporting said plurality of relational entities comprises defining and supporting by computer implemented steps an interpolative parametric spline curve entity, which may be actualized into one or more interpolative parametric spline curve objects, each of which depends on two or more point class objects that are specified therein by object identifiers.

12. The method of claim 7 wherein the step of defining and supporting said plurality of relational entities comprises defining and supporting by computer implemented steps one or more bead class entities which may be actualized into one or more bead class objects, each of said bead class objects representing a point at a specified position on a parametric curve object, said one or more bead class entities including an absolute bead entity which may be actualized into one or more absolute bead objects, each of which specifies (1) a parametric curve object by its object identifier and (2) a parameter value, wherein each said absolute bead object represents a point in design space located at said specified parameter value along a parametric curve in said design space that corresponds to the parametric curve object specified therein.

13. The method of claim 12 wherein the step of defining and supporting said plurality of relational entities comprises defining and supporting by computer implemented steps a subcurve entity which may be actualized into one or more subcurve objects, each of which specifies a parametric curve object by its object identifier and two bead class objects by their object identifiers, wherein each said subcurve object represents a portion of a curve that is represented by said curve class object said portion lying between points on said curve represented by said two bead class objects.

14. The method of claim 12 wherein the step of defining and supporting said plurality of relational entities comprises defining and supporting by computer implemented steps a relative bead entity, which may be actualized into one or more relative bead objects, each of which (1) depends on a bead class object specified therein by its object identifier and (2) specifies a parameter value offset, wherein each said relative bead object represents a point in design space that (a) lies on a parametric curve in design space corresponding to the bead class object specified therein and (b) is located at the specified parameter value offset along that parametric curve from a point on said parametric curve represented by said bead class object, thereby creating a multiple level dependency relationship.

15. The method of claim 7 wherein the step of defining and supporting a plurality of relational entities comprises defining and supporting by computer implemented steps a class of parametric surface entities, each of which may be actualized into one or more parametric surface objects, each of which depends on an ordered set of objects specified therein by object identifiers, wherein each of said one or more parametric surface objects represents a surface in design space defined by geometric shapes in design space that correspond to the ordered set of objects specified therein, thereby establishing a multiple dependency relationship of said surface with said geometric shapes.

16. The method of claim 15 wherein said an ordered set of objects is an ordered set of point class objects.

17. The method of claim 15 wherein said an ordered set of objects is an ordered set of curve class objects.

18. The method of claim 15 wherein said an ordered set of objects comprises point class objects and curve class objects.

19. The method of claim 15 wherein the step of defining and supporting a plurality of relational entities comprises defining and supporting by computer implemented steps one or more magnet class entities which may be actualized into one or more magnet class objects, each of said magnet class objects representing a point at a specified position on a parametric surface object, said one or more magnet class entities including an absolute magnet entity, which may be actualized into one or more absolute magnet objects, each of which (1) depends on a parametric surface object specified therein by its object identifier and (2) specifies parameter values, wherein each said absolute magnet object represents a point in design space located at said specified parameter values on a parametric surface in said design space that corresponds to the parametric surface object specified therein, thereby defining a point in design space that is constrained to lie on a parametric surface in a dependency relationship.

20. The method of claim 19 wherein the step of defining and supporting a plurality of relational entities comprises defining and supporting by computer implemented steps a relative magnet entity, which may be actualized into one or more relative magnet objects, each of which (1) depends on a magnet class object specified therein by its object identifier and (2) specifies parameter value offsets, wherein each said relative magnet object represents a point in design space that (a) lies on a parametric surface in design space corresponding to the magnet class object specified therein and (b) is located at the specified parameter value offsets upon that parametric surface from a point on said parametric surface that is represented by the magnet class object specified therein, thereby defining a point in design space that is constrained to lie on a parametric surface in a multiple level dependency relationship.

21. The method of claim 15 wherein said one or more surface class entities includes a ruled surface entity and wherein each of said one or more surface class objects actualized from said ruled surface entity is a ruled surface object which depends on an ordered set of two curve objects, wherein each of said ruled surface objects represents a surface in design space having two edges defined by curves in design space that correspond to the ordered set of two curve objects specified therein.

22. The method of claim 15 wherein said one or more surface class entities includes is an edge-blended surface entity and wherein each of said one or more surface class objects actualized from said edge-blended surface entity is a edge-blended surface object which depends on an ordered set of four curve objects, wherein each of said edge-blended surface objects represents a bilinear Coons patch in design space having four edges defined by curves in design space that correspond to the ordered set of four curve objects specified therein.

23. The method of claim 15 wherein said one or more surface class entities includes a lofted surface entity and wherein each of said one or more surface class objects actualized from said lofted surface entity is a lofted surface object which depends on an ordered set of three or more curve objects, wherein each of said lofted surface objects represents a surface in design space made up of an infinitude of curves that are interpolated through curves in design space which correspond to the ordered set of three or more curve objects specified therein.

24. The method of claim 19 wherein the step of defining and supporting a plurality of relational entities comprises defining and supporting by computer implemented steps a parametric snake entity, which may be actualized into one or more parametric snake objects, each of which (1) depends on two or more magnet objects specified therein by their object identifiers and each of which depends on a common parametric surface object and (2) represents a curve in design space that is constrained to lie on a parametric surface in design space that is represented by said common parametric surface object, thereby forming a multiple level dependency relationship.

25. The method of claim 24 wherein the step of defining and supporting a plurality of relational entities comprises defining and supporting by computer implemented steps a ring class entity, which may be actualized into one or more ring class objects, each of which (1) depends on a parametric snake object specified therein by its object identifier and (2) represents a point in design space that is constrained to lie on a parametric curve in design space that is represented by said parametric snake object, thereby forming a multiple level dependency relationship.

26. The method of claim 25 wherein the step of defining and supporting a plurality of relational entities comprises defining and supporting by computer implemented steps a subsnake entity which may be actualized into one or more subsnake objects, each of which specifies therein a parametric snake object by its object identifier and two ring class objects by their object identifiers, wherein each said subsnake object represents a portion of a curve that is represented by said parametric snake object, said portion lying between points on said curve represented by said two ring class objects.

27. The method of claim 25 wherein the step of defining and supporting a plurality of relational entities comprises defining and supporting by computer implemented steps a subsurface entity which may be actualized into one or more subsurface objects, each of which specifies therein a parametric surface object and four snake class objects by their object identifiers, wherein each said subsurface object represents a portion of a parametric surface that is represented by said parametric surface object, said portion of said parametric surface bounded by four points on said parametric surface that are represented by said snake class objects.

28. The method of claim 25 wherein the step of defining and supporting a plurality of relational entities comprises defining and supporting by computer implemented steps a relative ring entity, which may be actualized into one or more relative ring objects, each of which (1) depends on a ring class object specified therein by its object identifier, and (2) specifies a parameter value offset, wherein each said relative ring object represents a point in design space that (a) lies on a parametric curve in said design space corresponding to the snake object on which the ring class object specified therein depends and (b) is located at the specified parameter value offset along that parametric curve from a point on said parametric curve that is represented by said ring class object, thereby establishing a multiple level dependency relationship in which said ring object defines a point in design space that is constrained to lie on a parametric curve which in turn is constrained to lie on a parametric surface.

29. The method of claim 1 further comprising:

defining by computer implemented steps and storing in computer memory a logical geometric model made up of a collection of geometric objects that are actualized from said set of geometric entities, wherein said collection of geometric objects includes one or more relational objects, each of said relational objects being a geometric object actualized from one of said relational entities;

generating from said logical geometric model by computer implemented steps an absolute geometric model in terms of absolute coordinate geometry coordinates in the design space wherein the collection of geometric objects includes two of the surface class geometric objects actualized from said one or more surface call entities, each of said two surface class geometric objects depending on a common curve object which is identified therein by its object identifier, wherein said common curve object defines in design space a common edge shared by two surfaces defines by said two surface class geometric, and said method further comprising in response to a change in said common curve object, automatically updating the absolute geometric model so that said edge-blended, ruled, or lofted surface geometric objects remain joined along said common edge in new shapes and locations.

30. The method of claim 15 wherein the geometric entities supported by computer implemented steps include at least one ruled or lofted surface geometric entity which depends for actualization on two or more curve geometric objects specified by object name or number, and wherein two ruled or lofted surface geometric objects actualized from said ruled or lofted surface geometric entities are made to have a common edge by dependency on curve geometric objects having common endpoints, and comprising the further steps of changing one or more of said curve geometric objects, and automatically updating the geometric model so that said ruled or lofted surface geometric objects remain joined along said common edge in new shapes and locations.

31. The method of claim 19 wherein the geometric entities supported by computer implemented steps include at least one edge-blended, ruled or lofted surface entity depending on curve objects specified by object name or number, at least one of said curve objects forming at least one edge of a surface object actualized from said edge-blended, ruled or lofted surface entity, and an edge-blended, ruled or lofted surface object actualized from said edge-blended, ruled or lofted surface entity uses a snake object, specified by object name or number, lying on some other surface object, as an edge curve; and comprising the further steps of changing said other surface object or said snake object, and automatically updating the geometric model so that said edge-blended, ruled or lofted surface object remains joined to said other surface object along said snake geometric object in new shapes and positions.

32. The method of claim 1 further comprising defining and supporting by computer implemented steps a point routine for evaluating point class objects, said point routine programmed to call itself in a recursive manner.

33. The method of claim 1 further comprising defining and supporting by computer implemented steps a curve routine for evaluating curve class objects, said curve routine programmed to call itself in a recursive manner.

34. The method of claim 1 further comprising defining and supporting by computer implemented steps a surface routine for evaluating surface class objects, said surface routine programmed to call itself in a recursive manner.

35. The method of claim 1 wherein the at least one of said relational entities which is one of said surface class entities has two or more data fields, the valid data type of at least one of which includes an object identifier of a curve class object.

36. The method of claim 8 wherein said design space is of three or more dimensions.

* * * * *

UNITED STATES PATENT AND TRADEMARK OFFICE
CERTIFICATE OF CORRECTION

PATENT NO. : 5,581,672
DATED      : December 3, 1996
INVENTOR(S) : John S. Letcher, Jr.

It is certified that error appears in the above-identified patent and that said Letters Patent is hereby corrected as shown below:

Col. 10, line 49, "point111" should be --point11--.

Col. 10, line 52, "point111" should be --point11--.

Signed and Sealed this

Fifth Day of January, 1999

Attest:

Attesting Officer

*Acting Commissioner of Patents and Trademarks*